United States Patent
Eto et al.

(10) Patent No.: US 10,495,047 B2
(45) Date of Patent: Dec. 3, 2019

(54) HANDHELD ENGINE-DRIVEN WORKING MACHINE

(71) Applicant: YAMABIKO CORPORATION, Ohme-shi, Tokyo (JP)

(72) Inventors: Kuniyoshi Eto, Ohme (JP); Masayoshi Miyamoto, Ohme (JP)

(73) Assignee: YAMABIKO CORPORATION, Ohme-Shi, Tokyo (JP)

( * ) Notice: Subject to any disclaimer, the term of this patent is extended or adjusted under 35 U.S.C. 154(b) by 0 days.

(21) Appl. No.: 15/823,837

(22) Filed: Nov. 28, 2017

(65) Prior Publication Data
US 2018/0156180 A1    Jun. 7, 2018

(30) Foreign Application Priority Data
Dec. 6, 2016 (JP) ................. 2016-236903

(51) Int. Cl.
| | |
|---|---|
| F02P 5/06 | (2006.01) |
| F02P 5/02 | (2006.01) |
| F02P 5/00 | (2006.01) |
| F02B 63/02 | (2006.01) |
| F02P 1/00 | (2006.01) |
| F02P 1/08 | (2006.01) |
| F02P 5/145 | (2006.01) |

(52) U.S. Cl.
CPC ............. *F02P 5/06* (2013.01); *F02B 63/02* (2013.01); *F02P 1/005* (2013.01); *F02P 1/08* (2013.01); *F02P 5/005* (2013.01); *F02P 5/02* (2013.01); *F02P 5/145* (2013.01)

(58) Field of Classification Search
CPC ...... F02P 5/06; F02P 5/04; F02P 5/005; F02P 5/145; F02P 5/1504; F02P 1/005; F02P 1/08; F02P 1/086; F02B 63/02; F02B 2075/025; F02D 2400/06
USPC ........................ 123/406.24, 406.25
See application file for complete search history.

(56) References Cited

U.S. PATENT DOCUMENTS

| | | | |
|---|---|---|---|
| 4,722,311 A | 2/1988 | Erhard | |
| 6,427,647 B1* | 8/2002 | Galka | F02B 25/14 123/73 B |
| 7,185,632 B2* | 3/2007 | Knaus | F02P 5/1504 123/406.25 |

(Continued)

FOREIGN PATENT DOCUMENTS

JP    2012-7579 A    1/2012

OTHER PUBLICATIONS

European Search Report issued in European Patent Application No. 17204252.5 dated Jul. 26, 2018.

*Primary Examiner* — Mahmoud Gimie
(74) *Attorney, Agent, or Firm* — Baker & Hostetler LLP

(57) ABSTRACT

A handheld engine-driven working machine comprises an internal combustion engine and an ignition control device; wherein the ignition control device can switch its control between a normal mode and a operation mode, wherein during the operation mode, the ignition timing within the high speed range is maintained at a second BTDC angle, and the ignition timing within the medium speed range is advanced more than a third BTDC angle between a first BTDC angle and the second BTDC angle, and wherein at any rotational speed within the medium speed range, the ignition timing during the operation mode is advanced more than the ignition timing during the normal mode.

6 Claims, 10 Drawing Sheets

(56) References Cited

U.S. PATENT DOCUMENTS

2006/0021591 A1  2/2006 Knaus

* cited by examiner

HANDHELD ENGINE-DRIVEN WORKING MACHINE

FIELD OF THE INVENTION

The present invention relates to a handheld engine-driven working machine, specifically, to a handheld engine-driven working machine, such as a chain saw, a brush cutter, an engine cutter, and a hedge trimmer.

BACKGROUND OF THE INVENTION

A two-stroke internal combustion engine mounted on a handheld engine-driven working machine has a piston disposed in a cylinder and connected to a crankshaft, an ignition plug disposed in an upper portion of the cylinder, and an ignition control device activating the ignition plug. Effective activation of the ignition plug ignites fuel-air mixture in the cylinder to combust it, and inflation of the combusted air gives a force to the piston so as to move the piston from a top dead center position to a bottom dead center position. The ignition control device can set an ignition timing of the ignition plug with respect to the top dead center position of the piston (for example, a BTDC angle which is an angle of a crankshaft before the top dead center position).

The ignition control device is normally configured to set the ignition timing within a low speed range (for example, equal to or lower than 4,000 rpm) to a first BTDC angle A1 near the top dead center position of the piston and advance the ignition timing within a high speed range (for example, equal to or higher than 9,000 rpm) to a second BTDC angle A2 (see FIG. 13). This is because an output within the high speed range is enhanced. The ignition timing within a medium speed range (for example, 4,000-9,000 rpm) is defined so as to connect the ignition timing within the low speed range with the ignition timing within the high speed range (see, for example, Patent Publication 1).

PRIOR ART PUBLICATION

Patent Publication 1: Japanese Patent Laid-open Publication No. 2012-007579

When a thick tree is cut with a chain saw, a cutting operation is generally started by operating a throttle lever in a fully-opened position to allow the chain saw to be driven at a high rotational speed (for example, 10,000 rpm). When a blade is advanced into the tree, the engine is subject to a load to decrease the rotational speed of the chain saw from the high speed range. Then, the ignition timing is retarded more than the second BTDC angle A2 and the output of the chain saw is also decreased.

Further, when a number of narrow branches are cut with a chain saw, an operation to move the throttle lever to the fully-opened position to cut the branch at a high rotational speed (for example, 10,000 rpm) of the chain saw and an operation after one branch has been cut to release the throttle lever to decrease the rotational speed of the chain saw are generally repeated. When the rotational speed decreases lower than 9,000 rpm, the ignition timing is retarded more than the second BTDC angle A2 and the output is decreased so that acceleration for becoming the high rotational speed next time would be decreased.

If the rotational speed of achieving the second BTDC angle is set to 6,000 rpm (see FIG. 13), the decrease of the output and the decrease of the acceleration would be avoided. However, when fuel feeding of a carburetor is set to relatively lean, unintentional increase of the rotational speed may occur. Further, when the fuel is lean, even if the throttle lever is released, it would be difficult to decrease the rotational speed. Thus, it is preferable that the rotational speed of achieving the second BTDC angle A2 is not changed.

Thus, the object of the present invention is to provide a handheld engine-driven working machine in which the decrease of the output and the decrease of the acceleration within the medium speed range during operation can be improved.

SUMMARY OF THE INVENTION

To achieve the above-stated object, a handheld engine-driven working machine according to the present invention comprises an internal combustion engine which includes a cylinder, a crankshaft, a piston disposed in the cylinder and connected to the crankshaft, and an ignition plug disposed in an upper portion of the cylinder; and an ignition control device activating the ignition plug; wherein the ignition control device can switch its control between a normal mode and an operation mode, wherein during the normal mode, the ignition timing within a medium speed range is advanced from a first BTDC angle to a second BTDC angle as the rotational speed increases and the ignition timing within a high speed range is maintained at the second BTDC angle, wherein during the operation mode, the ignition timing within the high speed range is maintained at the second BTDC angle and the ignition timing within the medium speed range is advanced more than a third BTDC angle between the first BTDC angle and the second BTDC angle, and wherein at any rotational speed within the medium speed range, the ignition timing during the operation mode is advanced more than the ignition timing during the normal mode.

In this handheld engine-driven working machine, when the throttle lever is operated to a fully-opened position to move the rotational speed from the low speed range (idling operation state) to the high speed range, the ignition control device operates in the normal mode. Namely, within the medium speed range, the ignition control device advances the ignition timing from the first BTDC angle to the second BTDC angle as the rotational speed increases, and within the high speed range, the ignition control device maintains the ignition timing at the second BTDC angle. In contrast, after the control of the ignition control device is switched to the operation mode, within the high speed range, the ignition timing is maintained at the second BTDC angle, and within the medium speed range, the ignition timing is advanced more than the third BTDC angle between the first BTDC angle and the second BTDC angle so that at any rotational speed within the medium speed range, the ignition timing during the operation mode is advanced more than the ignition timing during the normal mode. Thus, within the medium speed range, the decrease of the output and the decrease of the acceleration can be avoided. For example, even if the blade of the chain saw is advanced into a tree to cause the rotational speed of the chain saw to decrease to the medium speed range, the decrease of the output of the chain saw could be reduced. Further, in order to cut a number of narrow branches with the chain saw, when the throttle lever is operated to the fully-opened position after the rotational speed of the chain saw decrease to the medium speed range by releasing the throttle lever, the acceleration of the chain saw can be enhanced.

In an embodiment of the handheld engine-driven working machine, preferably, within the medium speed range during the operation mode, the ignition timing may be maintained at the second BTDC angle or may be advanced or retarded from the second BTDC angle as the rotational speed decreases.

In an embodiment of the handheld engine-driven working machine, preferably, the ignition control device is configured to switch the operation mode to the normal mode, when the rotational speed becomes lower than a predetermined operation rotational speed or when a predetermined time has passed after the rotational speed becomes lower than a predetermined operation rotational speed.

In an embodiment of the handheld engine-driven working machine, preferably, the ignition control device is configured to switch the normal mode to the operation mode, when a predetermined time has passed after the rotational speed is higher than a predetermined operation rotational speed or when the rotational speed becomes higher than a predetermined operation rotational speed.

In an embodiment of the handheld engine-driven working machine, preferably, the ignition control device is configured to switch the normal mode to the operation mode when it is detected that the throttle valve is in a fully-opened position.

In an embodiment of the handheld engine-driven working machine, preferably, the ignition control device is configured to switch the normal mode to the operation mode when it is detected that the throttle valve is not in an idle position.

In an embodiment of the handheld engine-driven working machine, preferably, the ignition control device is configured to switch the operation mode to the normal mode when it is detected that the throttle valve is not in a fully-opened position, or when a predetermined time has passed after it is detected that the throttle valve is not in the fully-opened position, or it is detected that the throttle valve is in an idle position.

The handheld engine-driven working machine according to the present invention can improve the decrease of output and the decrease of acceleration within the medium speed range during operation.

DETAILED DESCRIPTION OF EMBODIMENTS

Figure 1:
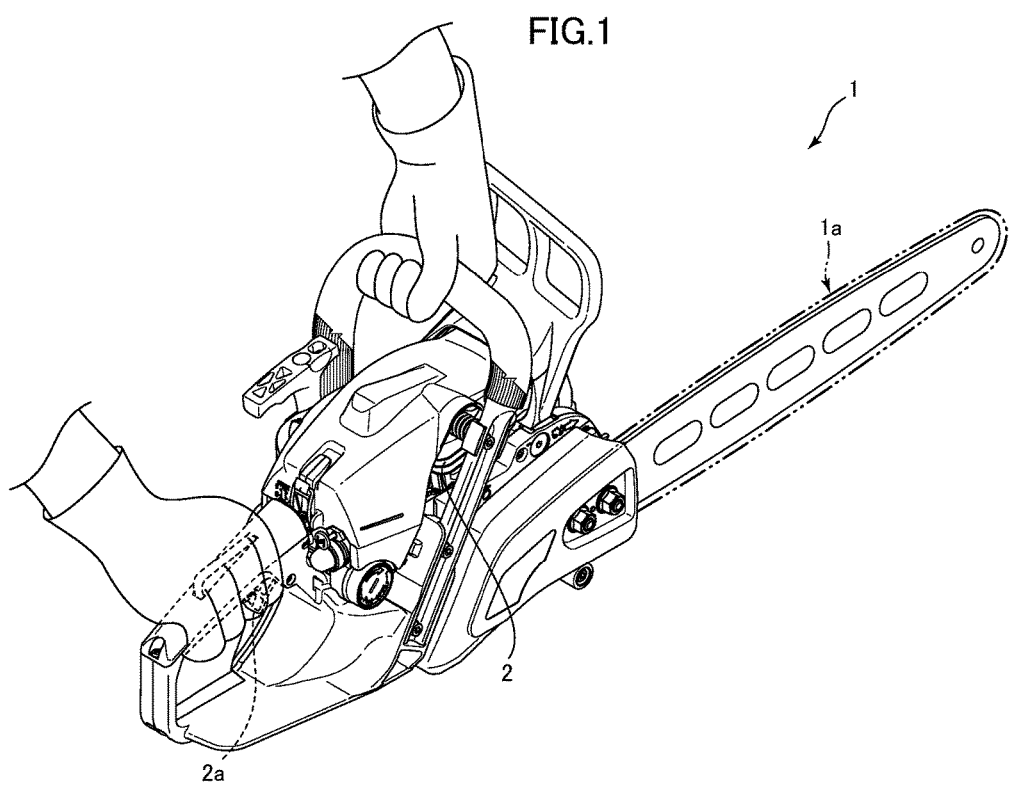
FIG. 1 is a perspective view of a chain saw according to the present invention.

Now, referring to the drawings, embodiments of a chain saw according to the present invention will be explained.

FIG. 1 is a perspective view of a chain saw which is an example of a handheld engine-driven working machine according to the present invention. The chain saw 1 has a two-stroke internal combustion engine 2 for driving it, and a throttle lever 2a activating a throttle valve 3 (see FIG. 2) which adjusts an amount of fuel-air mixture entering the internal combustion engine 2. The throttle valve 3 may be provided with a switch 3b which detects that the throttle valve 3 is in a fully-opened position or a switch 3c which detects that the throttle valve 3 is in an idle position.

Figure 2:
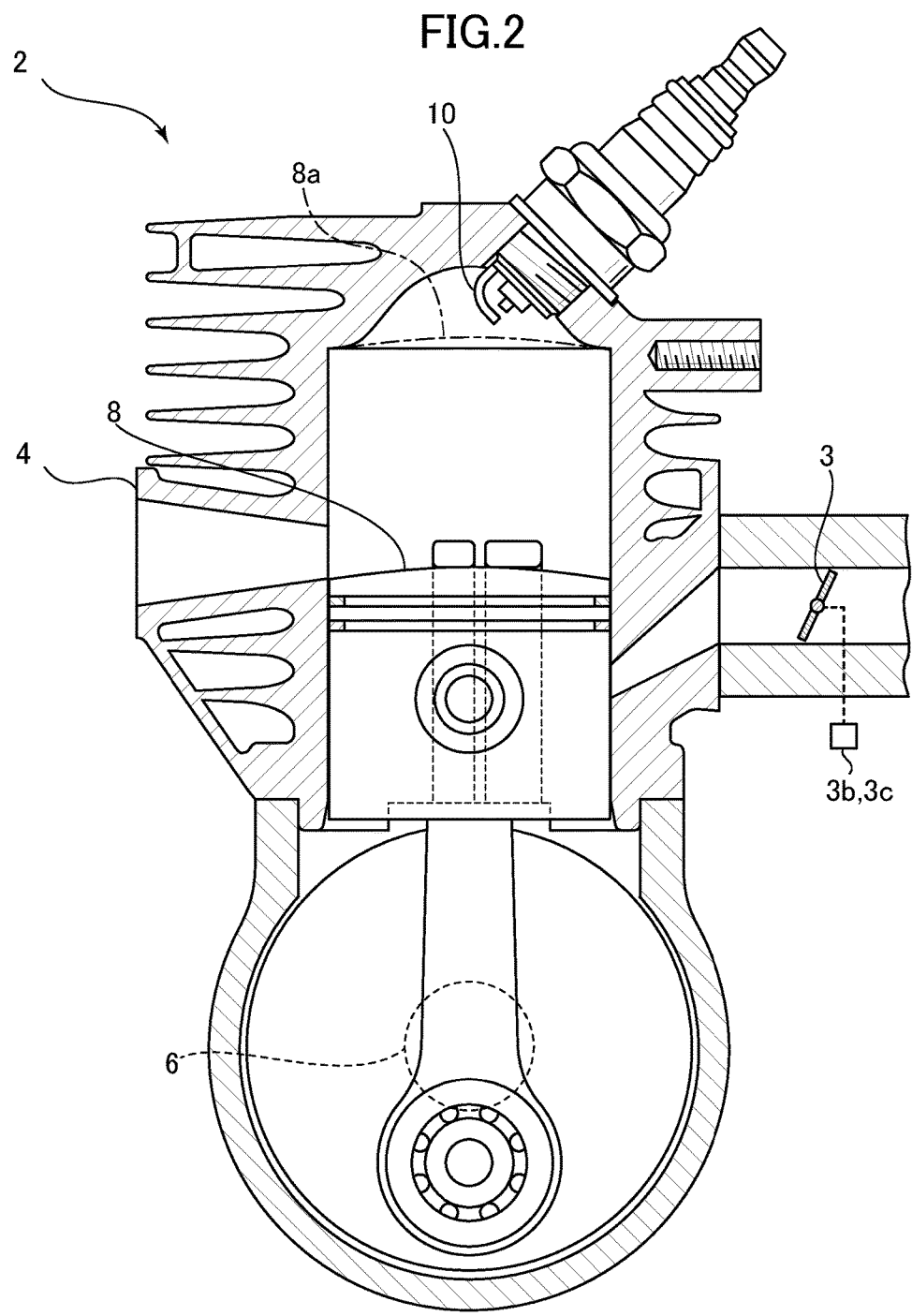
FIG. 2 is a schematic view of an internal combustion engine.

FIG. 2 is a schematic view of the two-stroke internal combustion engine 2 according to the present invention. The internal combustion engine 2 has a cylinder 4, a crankshaft 6, a piston 8 disposed in the cylinder 4 and connected to the crankshaft 6, and an ignition plug 10 disposed in an upper portion of the cylinder 4. In a compression stroke of the internal combustion engine 2, the piston 8 is raised to a top dead center position 8a. Generally, the ignition plug 10 is effectively activated at a timing before the piston 8 reaches the top dead center position 8a to combust fuel-air mixture in the cylinder 4, so that a downward propelling force is given to the piston 4.

Figure 3:
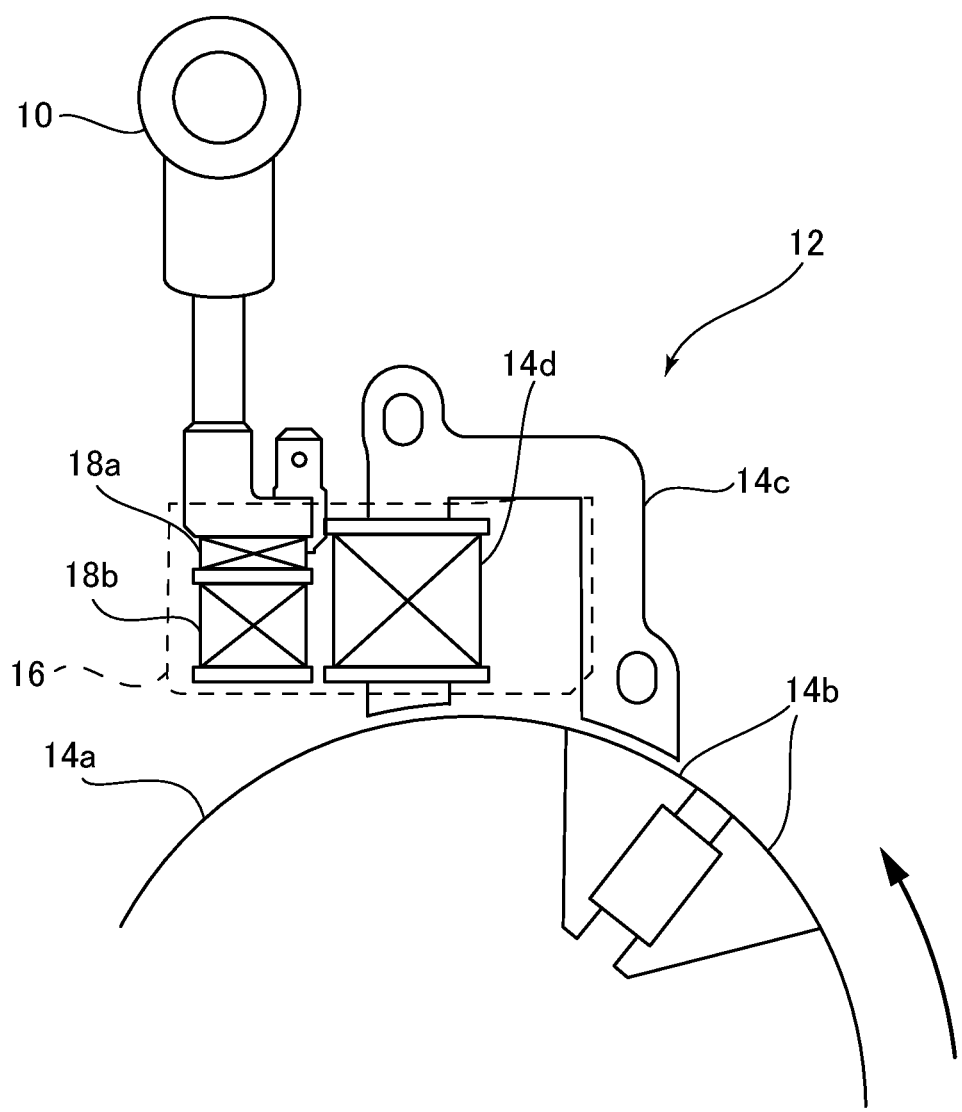
FIG. 3 is a schematic view of an ignition control device of the internal combustion engine.

FIG. 3 is a schematic view of an ignition control device of the internal combustion engine according to the present invention. The internal combustion engine 2 has an ignition control device 12 activating the ignition plug 10.

The ignition control device 12 has a pair of magnets 14b provided on a periphery of a flywheel 14a attached to the crankshaft 6, a U-shaped iron core 14c located adjacent to the periphery of the flywheel 14a, and an input coil 14d wound around the iron core 14c. Further, the ignition control device 12 has a control circuit section 16 connected to the input coil 14d, a primary coil 18a connected to the control circuit section 16, and a secondary coil 18b connected to the ignition plug 10.

Figure 4:
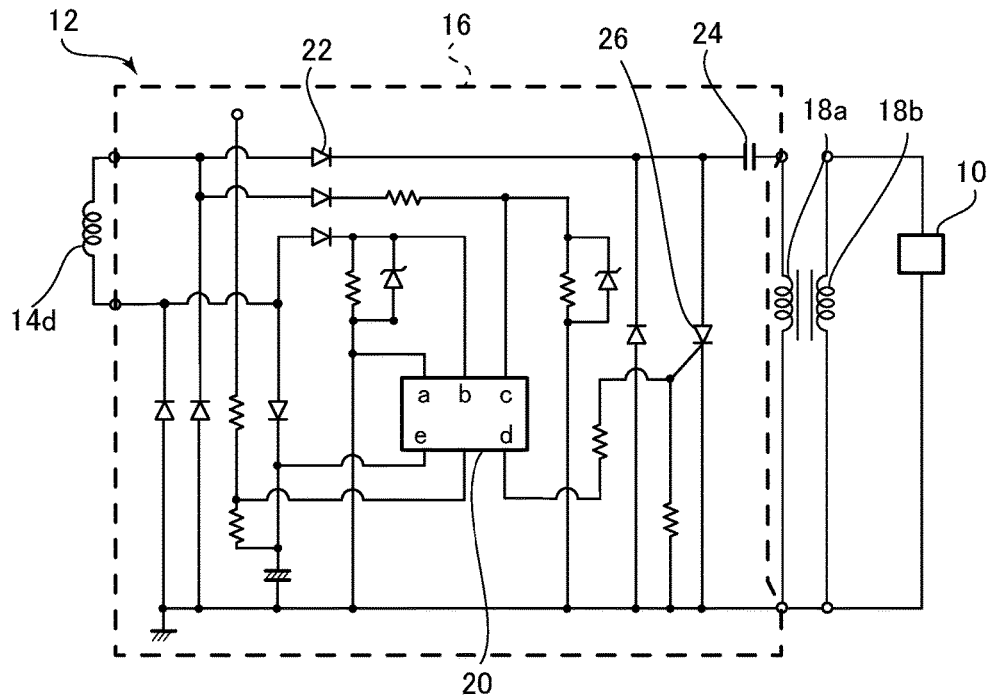
FIG. 4 is a circuit diagram of the ignition control device of the internal combustion engine.

FIG. 4 is a circuit diagram of the ignition control device of the internal combustion engine according to the present invention. As shown in FIG. 4, the control circuit section 16 has a processor 20, a diode 22, a capacitor 24, and a switching thyristor 26. Pin a and e of the processor 20 are connected to the input coil 14d, and a voltage deduced in the input coil 14d supplies an electric power to the processor 20. Pins b and c of the processor 20 are also connected to the input coil 14d, and the processor 20 receives an electric signal induced in the input coil 14d. The diode 22, the capacitor 24 and the primary coil 18a are connected to the input coil 14d in series. The switching thyristor 26 is connected to the capacitor 24 and the primary coil 18a in parallel. Further, a pin d of the processor 20 is connected to a gate of the switching thyristor 26. When the pin d is LOW, the thyristor 26 is in a non-current-carrying state, and the pin d is HIGH, the thyristor 26 is in a current-carrying state.

Next, an operation of the internal combustion engine according to the present invention will be explained.

When the crankshaft 6 is rotated due to an operation of the internal combustion engine 2, the pair of the magnets 14b attached to the flywheel 14a passes near the U-shaped iron core 14c. This induces a voltage in the input coil 14d so that current flows in the input coil 14d. The processor 20 is driven by the voltage supplied from the input coil 14d through the pins a and e, and receives an electric signal of the current through the pins b and c. The processor 20 detects or calculates a rotational speed and an angular position of the internal combustion engine 2 by using such electrical signals.

When the processor 20 makes the pin d LOW so that the thyristor 26 is in the non-current-carrying state, the capacitor 24 is charged by the voltage induced in the input coil 14d. When the ignition timing of the ignition plug 10 comes, the processor 20 makes the pin d HIGH so that the thyristor 26 becomes in the current-carrying state. Thus, the capacitor 24 is discharged to carry current through the primary coil 18a. The current carried through the primary coil 18a causes a high voltage pulse in the secondary coil 18b to activate the ignition plug 10.

Figure 5:
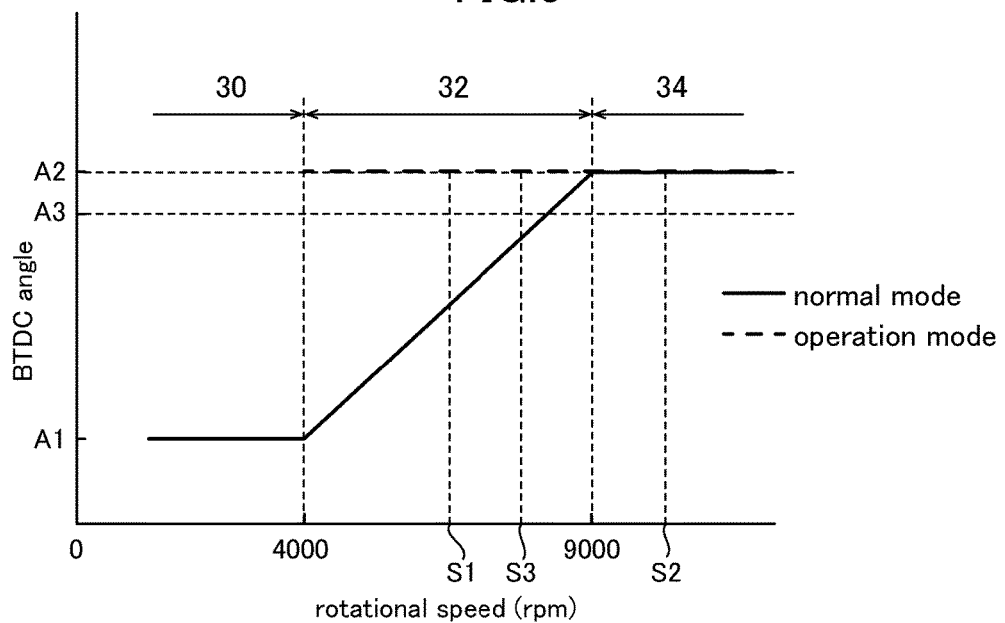
FIG. 5 is a graph showing a first example of a relationship between a rotational speed and an ignition timing of the internal combustion engine.
Figure 6:
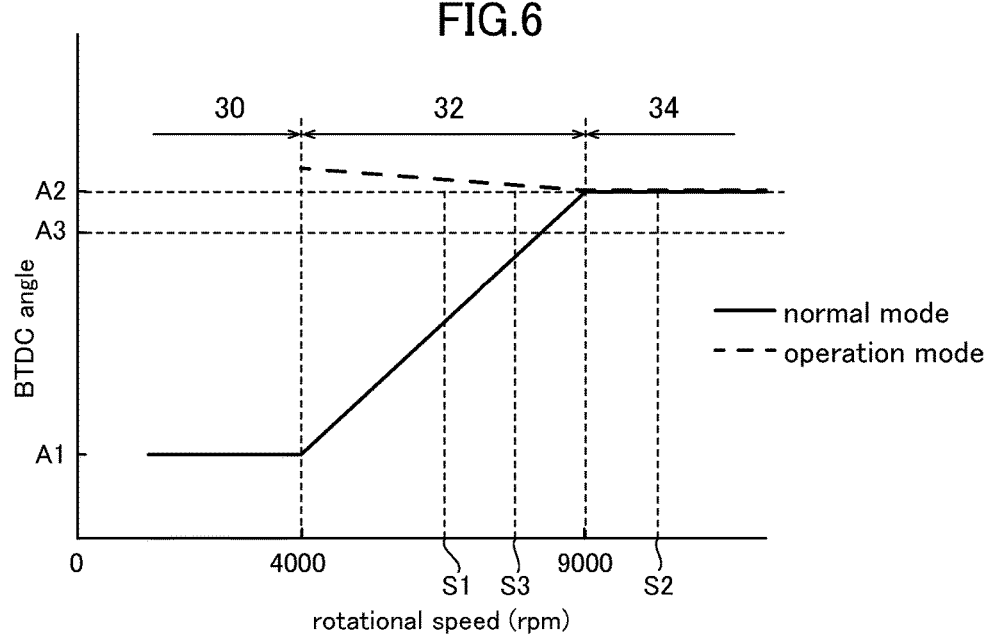
FIG. 6 is a graph showing a second example of a relationship between a rotational speed and an ignition timing of the internal combustion engine.
Figure 7:
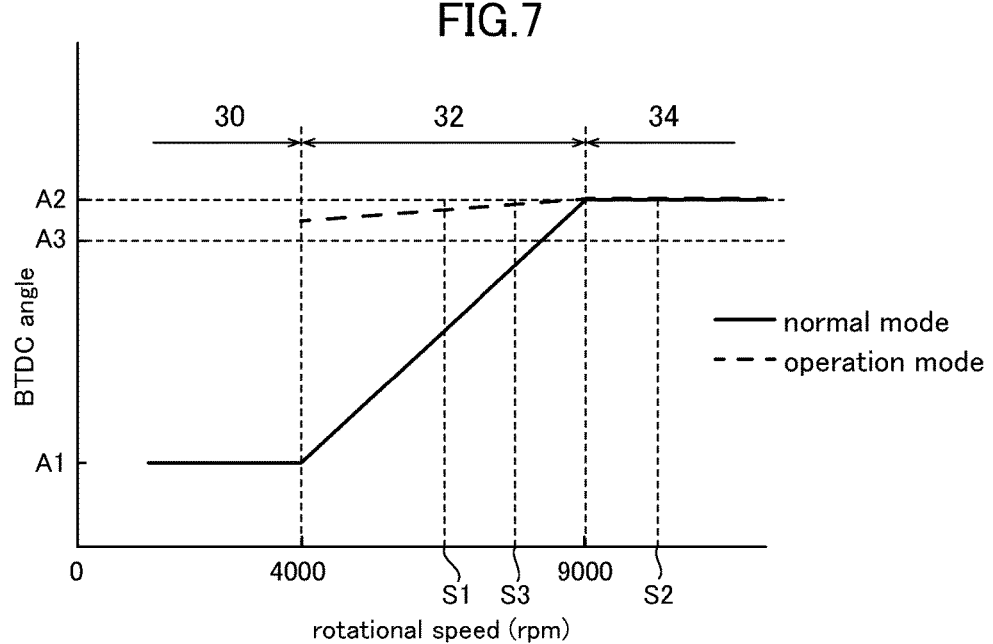
FIG. 7 is a graph showing a third example of a relationship between a rotational speed and an ignition timing of the internal combustion engine.

As illustrated in FIGS. 5-7, the processor 20 of the ignition control device 12 activates the ignition plug 10 at the ignition timing which is set according to the rotational speed of the internal combustion engine 2. In the present description, the ignition timing will be indicated by a BTDC angle (an angle of the crankshaft 6 before the top dead center position 8a). The ignition timing is activated in two modes, namely, a normal mode shown by a solid line and an operation mode shown by dotted line. As described later, the normal mode and the operation mode are appropriately switched.

In a first example shown in FIG. 5, during the normal mode, the ignition control device 12 sets respective different ignition timings within a low speed range 30 (for example, below 4,000 rpm), a medium speed range 32 (for example, 4,000-9,000 rpm) and a high speed range 34 (for example, over 9,000 rpm). Within the low speed range 30, the ignition timing is maintained at a relatively small (retarded) first BTDC angle A1. The first BTDC angle A1 is an angle near the top dead center point 8a of the piston 8 and, for example, 10-20 degrees. Within the high speed range 34, the ignition timing is maintained at a relatively large (advanced) second BTDC angle A2. The second BTDC angle A2 is, for example, 30-40 degrees. Within the medium speed range 32, the ignition timing is advanced from the first BTDC angle A1 to the second BTDC angle A2 as the rotational speed increases.

During the operation mode, the ignition control device 12 maintains the ignition timing within the high speed range 34 at the second BTDC angle A2, and advances the ignition timing within the medium speed range 32 more than a third BTDC angle A3 between the first BTDC angle A1 and the second BTDC angle A2. Namely, at any rotational speed within the medium speed range 32, the ignition timing during the operation mode is more advanced than the ignition timing during the normal mode. In the first example, the ignition timing within the medium speed range 32 is maintained at the second BTDC angle A2. As can be seen from FIG. 5, the ignition timings within the high speed range 34 during the normal mode and the operation mode are the same as each other, while the ignition timings within the medium speed range 32 during the normal mode and the operation mode are different from each other.

A second example shown in FIG. 6 is mostly the same as the first example, but different therefrom within the medium speed range 32 during the operation mode. Concretely, the ignition timing is gradually advanced from the second BTDC angle A2 as the rotational speed decreases. A maximum advanced angle is, for example, about 5-10 degrees. Within the medium speed range 32 during the operation mode, the ignition timing such as in the first or second example is preferable, unless knocking is caused.

A third example shown in FIG. 7 is mostly the same as the first example, but different therefrom within the medium speed range 32 during the operation mode. Concretely, the ignition timing is gradually retarded from the second BTDC angle A2 as the rotational speed decreases. A maximum retarded angle is, for example, about 5-10 degrees. Within the medium speed range 32 during the operation mode, the ignition timing such as in the third example is preferable, when knocking is caused. The third BTDC angle A3 is an angle smaller than a minimum BTDC angle expected when the ignition timing is gradually retarded from the second BTDC angle A2 as the rotational speed decreases.

Next, referring to FIGS. 8-12, five examples of flowcharts for switching a control between the normal mode and the operation mode will be explained. These examples are explained referring to the first example of the ignition timing, but also similar in the second example (FIG. 6) and the third example (FIG. 7).

Figure 8:
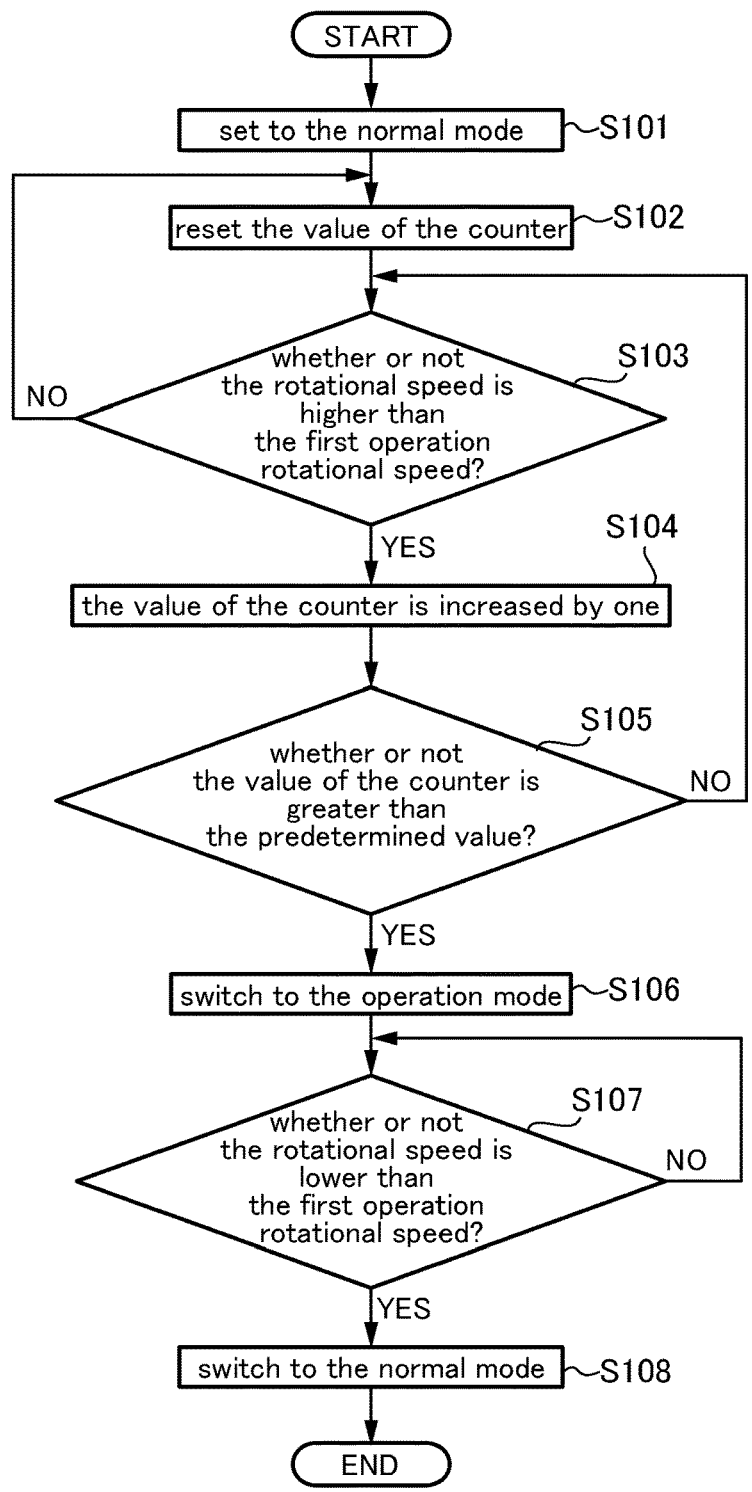
FIG. 8 is a first example of a flowchart showing a switching action between a normal mode and an operation mode.

Referring to FIG. 8, a first example of the flowchart for switching the control between the normal mode and the operation mode will be explained. Briefly, the chain saw is started with the normal mode, and the normal mode is switched to the operation mode after an appropriate time has passed from a time when the rotational speed excesses a first operation rotational speed S1. Then, the operation mode is switched to the normal mode, when the rotational speed decreases lower than the first operation rotational speed S1.

Concretely, in S101, the chain saw is set to the normal mode, and in S102, a value of a counter is reset. By opening the throttle valve 3 with the throttle lever 2a, the rotational speed increases from the low speed range 30 to the medium speed range 32. In S103, whether or not the rotational speed is higher than the first operation rotational speed S1 within the medium speed range 32 is determined. When the rotational speed is equal to or lower than the first operation rotational speed S1, the control is returned to S102. When the rotational speed is higher than the first operation rotational speed S1, in S104, the value of the counter is increased by one, and in S105, whether or not the value of the counter is greater than a predetermined value is determined. When the value of the counter is equal to or smaller than the predetermined value, namely, the appropriate time has not passed from the time when the rotational speed excesses the first operation rotational speed S1, the control is returned to S103. When the value of the counter is greater than the predetermined value, since it is considered that now is during operation, in S106, the normal mode is switched to the operation mode. The first operation rotational speed S1 is a reference operation rotational speed at which the operation is continued even if the rotational speed decreases from the high speed range 34 to the medium speed range 32 due to loads. For example, the first operation rotational speed S1 is defined so that the operation is continued even if the blade 1a of the chain saw 1 is advanced into a tree to cause the rotational speed to decrease to the medium speed range 32. During the operation mode, since the ignition timing is maintained at the second BTDC angle A2 not only within the high speed range 34 but also within the medium speed range 32, the output within the medium speed range 32 can be increased so that the operation can be effectively performed.

Then, in S107, whether or not the rotational speed is lower than the first operation rotational speed S1 is determined. When the rotational speed is equal to or higher than the first operation rotational speed S1, since it is considered that the operation is continued, the control is returned to S107 to maintain the operation mode. When the rotational speed is lower than the first operation rotational speed S1, since it is considered that the operation is completed, in S108, the operation mode is switched to the normal mode. Since the ignition timing is retarded more than the second BTDC angle A2, the rotational speed can surely decrease from the medium speed range 32 to the low speed range 30.

Figure 9:
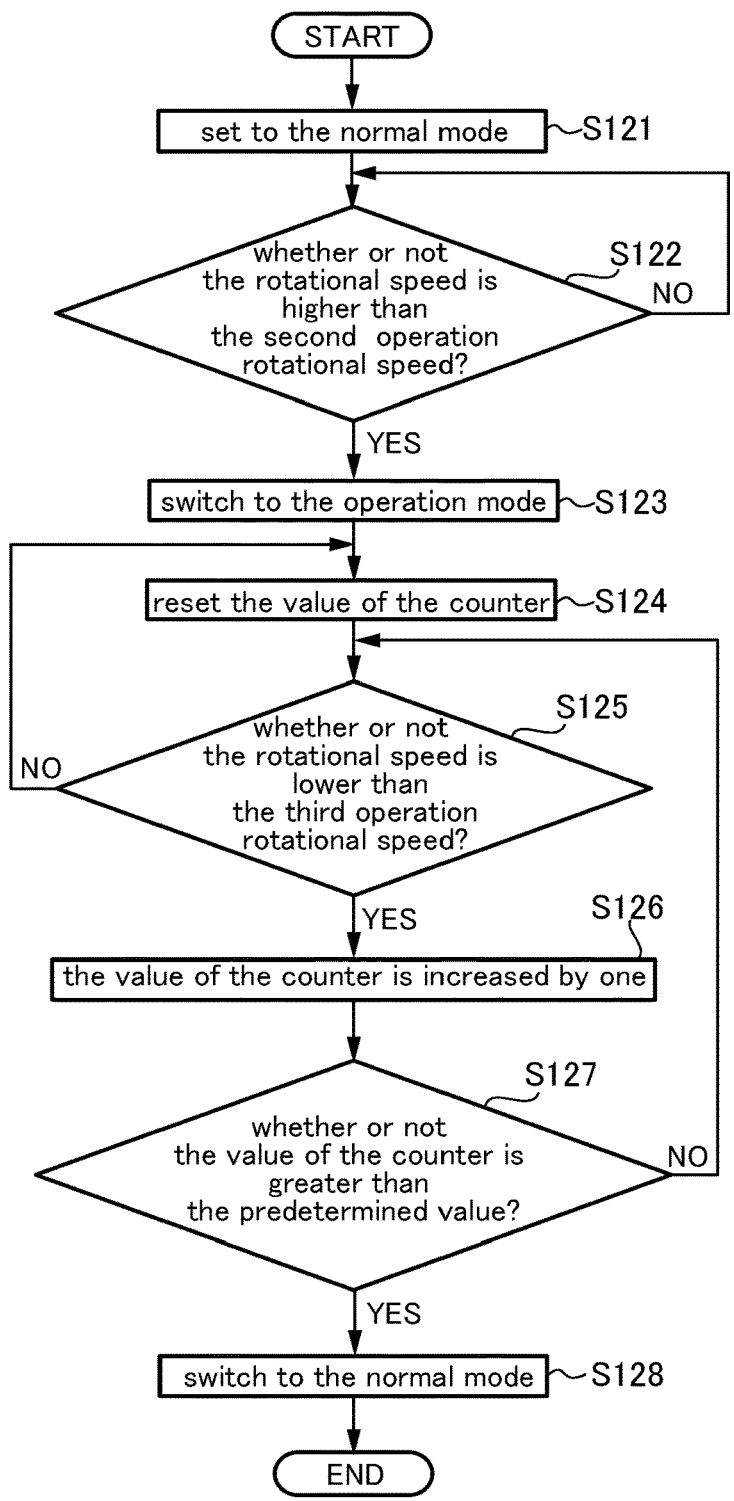
FIG. 9 is a second example of a flowchart showing a switching action between a normal mode and an operation mode.

Next, referring to FIG. 9, a second example of the flowchart for switching the control between the normal mode and the operation mode will be explained. Briefly, the chain saw 1 is started with the normal mode, and the normal mode is switched to the operation mode when the rotational speed excesses a second operation rotational speed S2 within the high speed range 34. Further, the operation mode is switched to the normal mode when an appropriate time has passed after the rotational speed decreases lower than a third operation notational speed S3.

Concretely, in S121, the chain saw 1 is set to the normal mode. By opening the throttle valve 3 with the throttle lever 2a, the rotational speed increases from the low speed range 30 through the medium speed range 32 to the high speed range 34. In S122, whether or not the rotational speed is higher than the second operation rotational speed S2 within the high speed range 34 is determined. When the rotational speed is equal to or lower than the second operation rotational speed S2, the control is returned to S122. The rotational speed is higher than the second operation rotation speed S2, in S123, the normal mode is switched to the operation mode. During the operation mode, for example, when the throttle valve 3 of the chain saw 1 is operated so as to repeat its fully-opened state and fully-closed state to cut a number of narrow branches, since the ignition timing is maintained at the second BTDC angle A2, an acceleration performance when the throttle valve 3 is in the fully-opened state is enhanced so that the operation can be effectively performed.

Next, in S124, the value of the counter is reset. In S125, whether or not the rotational speed is lower than the third operation rotational speed S3 within the medium speed range 32 is determined. When the rotational speed is equal to or higher than the third operation rotational speed S3, the control is returned to S124. When the rotational speed is lower than the third operation rotational speed S3, in S126, the value of the counter is increased by one and in S127, whether or not the value of the counter is greater than a predetermined value is determined. When the value of the counter is equal to or smaller than the predetermined value, namely, when an appropriate time has not passed after the rotational speed decreases lower than the third operation rotational speed S3, the control is returned to S125. When the value of the counter is greater than the predetermined value, since it is considered that the operation is completed, in S128, the operation mode is switched to the normal mode. The third operation rotational speed S3 is a reference operation rotational speed at which the operation is continued even if the rotational speed decreases to the medium speed range 32 when the throttle valve 3 of the chain saw 1 is operated so as to repeat the fully-opened state and the fully-closed state to cut a number of narrow branches. During the normal mode, since the ignition timing is smaller than the second BTDC angle A2, the rotational speed can surely decrease from the medium speed range 32 to the low speed range 30.

Figure 10:
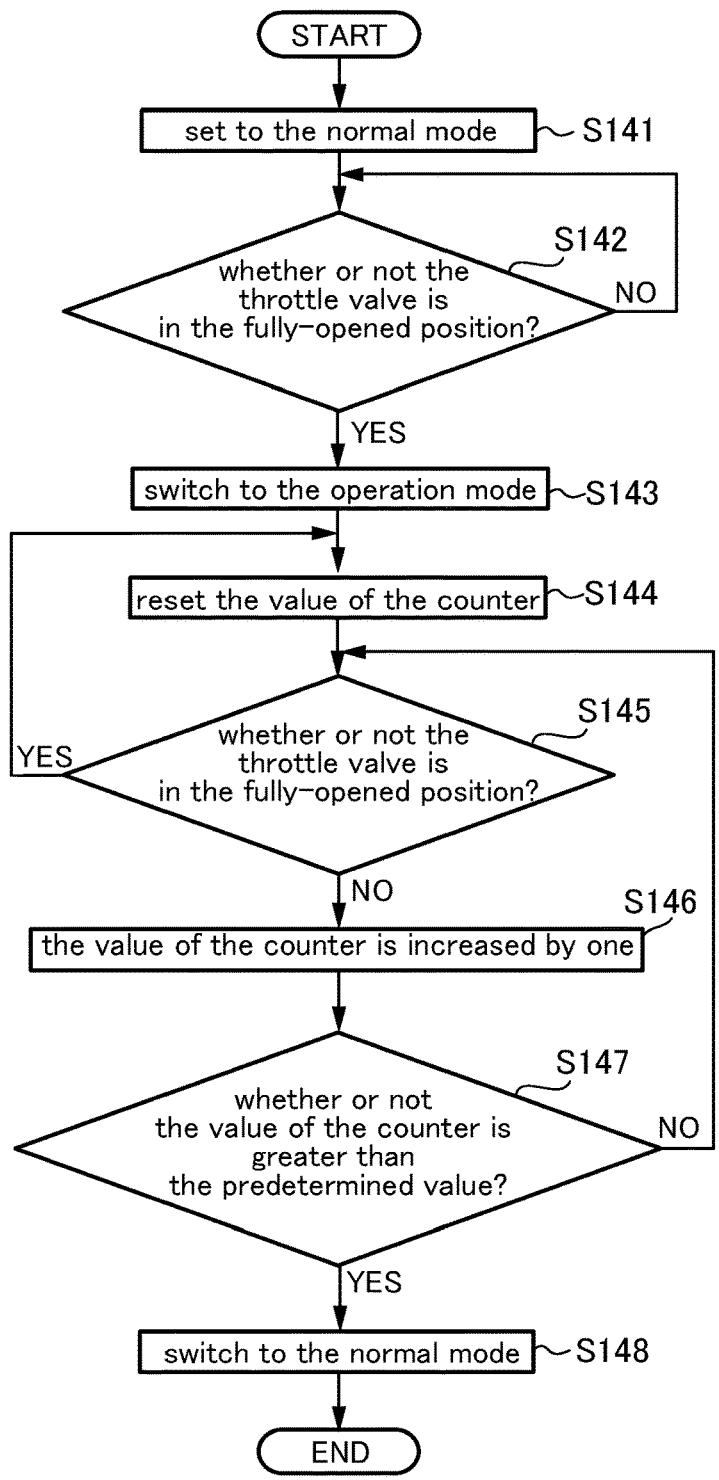
FIG. 10 is a third example of a flowchart showing a switching action between a normal mode and an operation mode.

Next, referring to FIG. 10, a third example of the flowchart for switching the control between the normal mode and the operation mode will be explained. In this example, the switch 3b for detecting that the throttle valve 3 is in the fully-opened position is used. Briefly, the chain saw 1 is started with the normal mode, and the normal mode is switched to the operation mode when it is detected that the throttle valve 3 is in the fully-opened position. Further, the operation mode is switched to the normal mode when an appropriate time has passed after it is detected that the throttle valve 3 is not in the fully-opened position.

Concretely, in S141, the chain saw 1 is set to the normal mode. By opening the throttle valve 3, the rotational speed increases from the low speed range 30 through the medium speed range 32 to the high speed range 34. In S142, whether or not the throttle valve 3 is in the fully-opened position is determined. When the throttle valve 3 is not in the fully-opened position, the control is returned to S142. When the throttle valve 3 is in the fully-opened position, in S143, the normal mode is switched to the operation mode. During the operation mode, for example, when the throttle valve 3 of the chain saw 1 is operated so as to repeat the fully-opened state and the fully-closed state to cut a number of branches, since the ignition timing is maintained at the second BTDC angle A2, the acceleration performance when the throttle valve is in the fully opened state can be enhanced so that the operation can be effectively performed.

Next, in S144, the value of the counter is reset. In S145, whether or not the throttle valve 3 is in the fully-opened position is determined. When the throttle valve 3 is in the fully-opened position, the control is returned to S144. When the throttle valve 3 is not in the fully-opened position, in S146, the value of the counter is increased by one and in S147, whether or not the value of the counter is greater than a predetermined value is determined. When the value of the counter is equal to or smaller than the predetermined value, namely, when an appropriate time expected to allow the throttle valve to become in the fully-opened position again has not been passed although it is not in the fully-opened position, the control is returned to S143. When the value of the counter is greater than the predetermined value, since it is considered that the operation is completed, in S148, the operation mode is switched to the normal mode. During the normal mode, since the ignition timing is retarded more than the second BTDC angle A2, the rotational speed can surely decrease from the medium speed range 32 to the low speed range 30.

Figure 11:
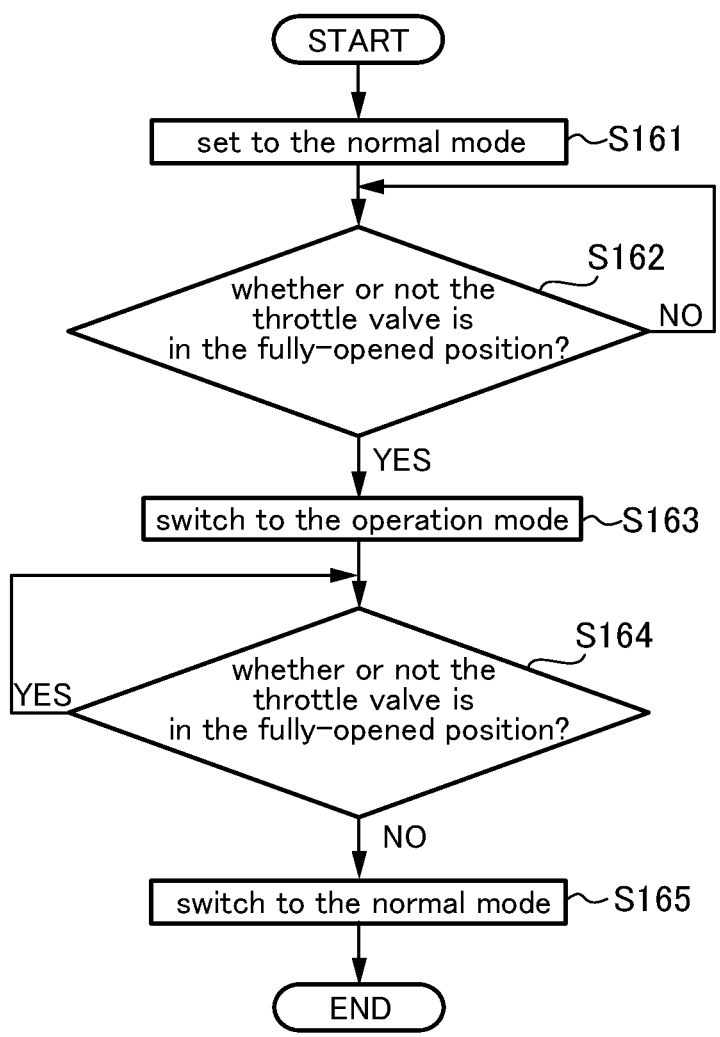
FIG. 11 is a fourth example of a flowchart showing a switching action between a normal mode and an operation mode.

Next, referring to FIG. 11, a fourth example of the flowchart for switching the control between the normal mode and the operation mode will be explained. In this example, the switch 3b for detecting that the throttle valve is in the fully-opened position is used. Briefly, the chain saw 1 is started with the normal mode, and the normal mode is switched to the operation mode when it is detected that the throttle valve 3 is in the fully-opened position. Further, the operation mode is switched to the normal mode when it is detected that the throttle valve 3 is not in the fully-opened position.

Concretely, in S161, the chain saw 1 is set to the normal mode. By opening the throttle valve 3 with the throttle lever 2a, the rotational speed increases from the low speed range 30 through the medium speed range 32 to the high speed range 34. In S162, whether or not the throttle valve 3 is in the fully-opened position is determined. When the throttle valve 3 is not in the fully-opened position, the normal mode is maintained, and the control is returned to S162. When the throttle valve 3 is in the fully-opened position, in S163, the normal mode is switched to the operation mode. During the operation mode, since the ignition timing is maintained at the second BTDC angle A2 not only within the high speed range 34 but also within the medium speed range 32, for example, even if the blade 1a of the chain saw 1 is advanced into a tree so that the rotational speed decreases to the medium speed range 32, the output in the medium range 32 is increased so that the operation can be effectively performed.

Next, in S164, whether or not the throttle valve 3 is in the fully-opened position is determined. When the throttle valve 3 is in the fully-opened position, the operation mode is maintained and the control is returned to S164. When the throttle valve 3 is not in the fully-opened position, since it is considered that the operation is completed, in S165, the operation mode is switched to the normal mode. Since the ignition timing is retarded more than the second BTDC angle A2, the rotational speed can surely decrease from the medium speed range 32 to the low speed range 30.

Figure 12:
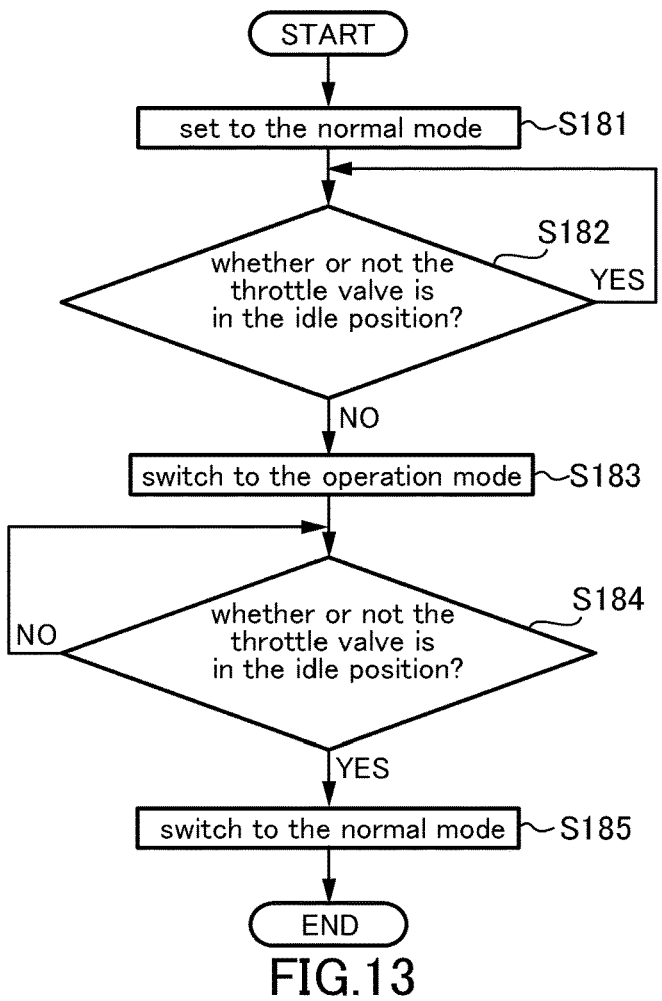
FIG. 12 is a fifth example of a flowchart showing a switching action between a normal mode and an operation mode.
Figure 13:
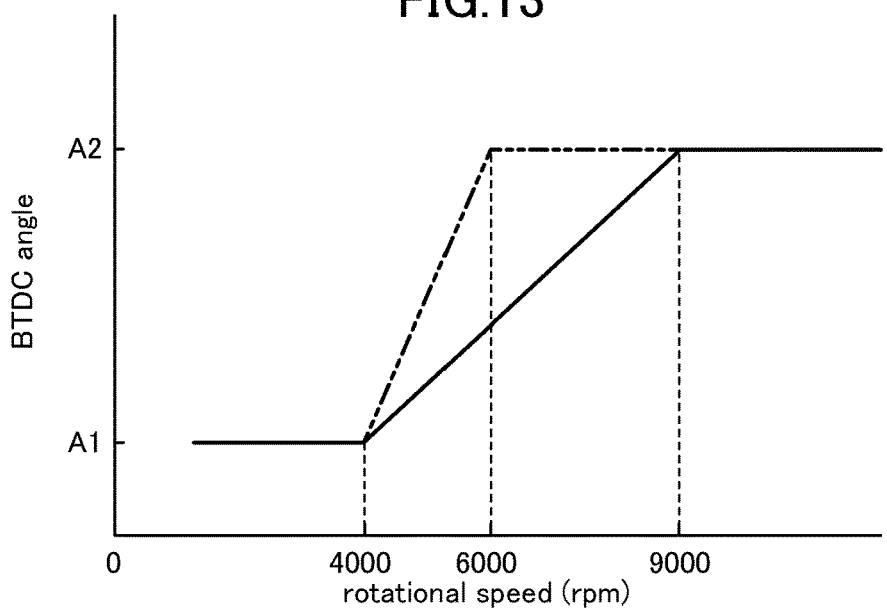
FIG. 13 is a graph showing a relationship between a rotational speed and an ignition timing of the internal combustion engine in prior art.

Next, referring to FIG. 12, a fifth example of the flowchart for switching the control between the normal mode and the operation mode will be explained. Briefly, the chain saw 1 is started with the normal mode, and the normal mode is switched to the operation mode when it is detected that the throttle valve 3 is not in the idle position. Further, the operation mode is switched to the normal mode when it is detected that the throttle valve 3 is in the idle position.

Concretely, in S181, the chain saw 1 is set to the normal mode. In S182, whether or not the throttle valve 3 is in the idle position is determined. When the throttle valve 3 is in the idle position, the normal mode is maintained, and the control is returned to S182. When the throttle valve 3 is not in the idle position, since the throttle valve 3 is opened by the throttle lever 2a so that the rotational speed increases from the low speed range 30 through the medium speed range 32 to the high speed range 34, in S183, the normal mode is switched to the operation mode. During the operation mode, since the ignition timing is maintained at the second BTDC angle A2 not only within the high speed range 34 but also within the medium speed range 32, for example, even if the blade 1a of the chain saw 1 is advanced into a tree so that the rotational speed decreases to the medium speed range 32, the output within the medium speed range 32 is increased so that the operation can be effectively performed.

Next, in S184, whether or not the throttle valve 3 is in the idle position is determined. When the throttle valve 3 is not in the idle position, the operation mode is maintained, and the control is returned to S184. When the throttle valve 3 is in the idle position, since it is considered that the operation is completed, in S185, the operation mode is switched to the normal mode. During the normal mode, since the ignition timing is retarded more than the second BTDC angle A2, the rotational speed can surely decrease from the medium speed range 32 to the low speed range 30.

Although the embodiments of the present invention have been explained, the present invention is not limited to the embodiments, namely, many kinds of modifications can be done within the scope of the present invention, and it goes without saying that such modifications fall within the scope of the present invention.

In the examples of the above-stated flowcharts, the counter is used in order that the appropriate time has passed, but a timer may be used. Further, in the examples in which the counter is not used before the control is switched between the normal mode and the operation mode, the counter may be used.

In the above-stated embodiments, it has been explained that the switch 3b for detecting that the throttle valve 3 is in the fully-opened position or the switch 3c for detecting that the throttle valve 3 is in the idle position is attached to the throttle valve 3, but such a switch may be attached to the throttle lever 2a.

The high speed range 34 and the low speed range 30 in the above-stated explanation mean ranges at least near the medium speed range 32. Thus, in regions far from the medium speed range 32, the ignition timing may not be maintained at the first BTDC angle A1 or the second BTDC angle A2.

In the first, fourth and fifth examples of the above-stated flowcharts, an event of cutting a thick tree has been explained, but the first, fourth and fifth examples may be used for cutting a number of narrow trees. In the second and third examples of the above-stated flowcharts, an event of cutting a number of narrow trees has been explained, but the second and third examples may be used for cutting a thick tree.

In the above-stated embodiment, an example in which the handheld engine-driven working machine is a chain saw is explained, but the handheld engine-driven working machine may be a brush cutter, an engine cutter, a hedge trimmer and so on.

What is claimed:

1. A handheld engine-driven working machine comprising:
    an internal combustion engine which includes a cylinder, a crankshaft, a piston disposed in the cylinder and connected to the crankshaft, and an ignition plug disposed in an upper portion of the cylinder; and
    an ignition control device activating the ignition plug;
    wherein the ignition control device can switch its control between a normal mode and an operation mode,
    wherein when acceleration is performed during the normal mode, the ignition timing is set by the ignition control device so as to, within a medium speed range, be advanced from a first BTDC angle to a second BTDC angle as the rotational speed increases and, within a high speed range, be maintained at the second BTDC angle,
    wherein when acceleration and deceleration are performed during the operation mode, the ignition timing is set by the ignition control device so as to, within the high speed range, be maintained at the second BTDC angle, and within the medium speed range, be maintained at the second BTDC angle as the rotational speed decreases,
    wherein at any rotational speed within the medium speed range, the ignition timing during the operation mode is advanced more than the ignition timing during the normal mode, and
    wherein when deceleration is performed during the normal mode, the ignition timing is set by the ignition control device so as to, within a medium speed range, be retarded from a second BTDC angle to a first BTDC angle as the rotational speed decreases.

2. The handheld engine-driven working machine according to claim 1, wherein the ignition control device is configured to switch the operation mode to the normal mode, when the rotational speed becomes lower than a predetermined operation rotational speed or when a predetermined time has passed after the rotational speed becomes lower than a predetermined operation rotational speed.

3. The handheld engine-driven working machine according to claim 1, wherein the ignition control device is configured to switch the normal mode to the operation mode, when a predetermined time has passed after the rotational speed becomes higher than a predetermined operation rotational speed or when the rotational speed becomes higher than a predetermined operation rotational speed.

4. The handheld engine-driven working machine according to claim 1, wherein the ignition control device is configured to switch the normal mode to the operation mode when it is detected that the throttle valve is in a fully-opened position.

5. The handheld engine-driven working machine according to claim 1, wherein the ignition control device is configured to switch the normal mode to the operation mode when it is detected that the throttle valve is not in an idle position.

6. The handheld engine-driven working machine according to claim 1, wherein the ignition control device is configured to switch the operation mode to the normal mode when it is detected that the throttle valve is not in a fully-opened position, or when a predetermined time has passed after it is detected that the throttle valve is not in the fully-opened position, or it is detected that the throttle valve is in an idle position.

* * * * *